US006201041B1

(12) United States Patent
Pasbrig et al.

(10) Patent No.: US 6,201,041 B1
(45) Date of Patent: Mar. 13, 2001

(54) SUBSTRATE WITH AN UNDERCOAT FOR PRINTING PURPOSES

(75) Inventors: Erwin Pasbrig, Hilzingen; Dietrich Bubeck, Singen, both of (DE)

(73) Assignee: Alusuisse Technology & Management Ltd. (CH)

( * ) Notice: Subject to any disclaimer, the term of this patent is extended or adjusted under 35 U.S.C. 154(b) by 0 days.

(21) Appl. No.: 09/326,852

(22) Filed: Jun. 7, 1999

Related U.S. Application Data

(62) Division of application No. 09/182,697, filed on Oct. 29, 1998, which is a continuation of application No. 08/807,475, filed on Feb. 27, 1997, now abandoned.

(30) Foreign Application Priority Data

Mar. 13, 1996 (EP) .......... 96810154

(51) Int. Cl.[7] .......... C08K 9/00

(52) U.S. Cl. .......... 523/206; 524/449; 524/451; 523/209; 523/216; 523/521

(58) Field of Search .......... 523/509, 521, 523/206, 209, 216; 524/449, 492, 451, 35, 589, 591; 525/374, 375

(56) References Cited

U.S. PATENT DOCUMENTS 4,346,149 * 8/1982 Sullivan .......... 428/516
5,036,118 * 7/1991 Martinez .......... 523/212
5,049,594 * 9/1991 Jeffs .......... 523/205
5,250,591 * 10/1993 Fujii et al. .......... 523/521
5,667,580 * 9/1997 Babler .......... 106/499
5,711,793 * 1/1998 Dannhorn et al. .......... 106/169.12

FOREIGN PATENT DOCUMENTS

158619 * 12/1975 (JP) .......... 3/68
8178417 * 11/1983 (JP) .......... 299/4

* cited by examiner

*Primary Examiner*—Edward J. Cain
*Assistant Examiner*—Katarzyna I Wyrozebski-Lee
(74) *Attorney, Agent, or Firm*—Bachman & LaPointe, P.C.

(57) ABSTRACT

A substrate with an organic undercoat as bonding layer for a printing medium to be deposited subsequently on the substrate in a printing process is such that the organic undercoat contains fine grained constituents of organic and/or inorganic substances, whereby the surface of the inorganic constituents is treated or provided with a coating of organic substances. Suitable inorganic constituents are e.g. highly dispersed silica, the surface of which is treated with a resin or a polymer. Suitable compositions for the organic undercoat layer on the substrate are organic coatings based on many commercially available organic coating materials with an addition of e.g. 0.3 to 20 wt. % silica. By adding highly dispersed silica to the undercoat the adhesion between the undercoat and the printing medium can be greatly improved, also in the case of laser printing methods with small thermal energy.

10 Claims, No Drawings

SUBSTRATE WITH AN UNDERCOAT FOR PRINTING PURPOSES

CROSS-REFERENCE TO RELATED APPLICATIONS

This application is a divisional of U.S. patent application Ser. No. 09/182,697, filed Oct. 29, 1998, which in turn is a continuation of U.S. patent application Ser. No. 08/807,475, filed Feb. 27, 1997, now abandoned.

BACKGROUND OF THE INVENTION

The invention relates to a substrate with an undercoat as bonding layer for a printing medium to be deposited subsequently on the substrate in a laser printing process. Also within the scope of the invention is a suitable coating composition providing an undercoating on a substrate and the use of a printed substrate.

Aluminum and plastic lidding foils for blister packs are almost always provided with printed decorative patterns or images. Suitable for large series are flexo-printing and photo-gravure printing processes; for smaller series the printing may be performed in-line on the packaging equipment. Smaller elements of the image that consistently change from image to image, such as EAN and number codes, are added to these images normally by means of ink-jet printing. In order to provide smoothness, protection of the substrate and adhesion for the printing medium, by far the greater part of these images is deposited on a thin undercoat. This undercoat must be able to withstand the normal hot sealing at temperatures of up to 260° C. experienced on sealing the blister pack, and it must not adhere to the blank or coated metallic, hot sealing tools. For that reason only organic coating materials with the smallest possible thermoplasticity come into question.

Recently, in addition to the above mentioned printing methods, a new printing process has been developed which, as with flexo, printing and photo-gravure printing—for images of similar size, offers the possibility to change the image completely from print to print with practically negligible time delay. This may take place externally or in-line on the packaging equipment. The mode of operation is similar to that in laser printing on paper. A printing medium is transferred to a laser activated printing roll and fixed on the substrate by the thermal energy of a flash of light, e.g. by a xenon arc lamp.

This thermal energy is many times smaller than that provided in the thermal activation of laser printing. Under these conditions, the organic undercoats used up to now have provided only insufficient bonding of the printing medium. By adjusting the composition of the organic undercoat to the basic binding agent of the printing medium it has been possible to improve the adhesion of the printing medium to the organic undercoat, but only insignificantly.

SUMMARY OF THE INVENTION

In view of the above, the object of the present invention is to provide a substrate of the kind mentioned at the start or to provide a suitable composition of organic undercoat, by means of which the adhesion between the undercoat and the printing material is improved in a simple manner. The substrate should in particular make it possible to use laser printing processes also when applying low thermal energy to activate the medium used for printing. The aim is, thereby, to overcome the conflicting requirements of thermally activating the powdered printing medium in order to bond it to the substrate and the thermal resistance or low thermoplasticity of the organic undercoat.

That objective is achieved by way of the invention in that the organic undercoat is fine grained and contains organic and/or inorganic substances, whereby the surface of the inorganic constituents is treated or provided with a layer of organic substances.

By addition of the fine grained constituents the surface area of the undercoat layer is greatly increased.

DETAILED DESCRIPTION OF PREFERRED EMBODIMENTS

Preferred fine grained constituents are highly dispersed silica, talcum, siliceous earth, untreated or pre-surface-treated mica, the surfaces of which are treated with organic materials such as resins or polymers, or are provided with a coating of organic materials. The organic particles may also be organic additives, resins or polymers such as e.g. polyamides and PU-resins which do not dissolve in the organic coating material and therefore increase the size of the surface in the same way as the organic fillers.

Preferred substrates include foils of metal, plastic, paper or laminates made therefrom.

The concentration of fine grained constituents in the organic undercoat or in the undercoat composition is preferably between about 0.1 and 20 wt. %, preferably between 0.3 and 10 wt. %.

It has been found that a variety of commercially available organic binders may be used for the preparation of the undercoat. Good adhesion between the undercoat and the printing medium is obtained e.g. with an undercoat based on melamine or polyesters that are cross-linkable with urea type resins or polystyrene-acrylates, non cross-linkable cellulose nitrates or multiple addition cross-linkable systems, in particular systems based on isocyanate, isocyanurate cured organic coatings based on polyester or polyacrylate basis, if desired mixed with non cureable fractions.

The surface of the inorganic constituents is preferably covered with the same substances as are employed to make up the organic undercoat. Of course other organic components may be employed for coating the inorganic constituents.

A preferred field of application for a printed substrate according to the invention in which the substrate is of aluminum, plastic or an aluminum/plastic composite is hot-sealable packaging films, in particular as film material for sealing blister packs by hot sealing, or for pouches.

Further advantages, features and details of the invention are revealed in the following description of preferred exemplified embodiments.

EXAMPLE 1

An organic coating material of the following composition 35 wt. % cross-linkable polyester resin 7 wt. % melamine resin 3 wt. % epoxy resin 4 wt. % catalyst solution 51 wt. % solvent resulted, at an undercoat thickness of 1 to 2 $\mu$m, to very imperfect printing results using a laser printing system. Addition of 0.1 to 20 wt. % highly dispersed silica of small grain size treated with polyester resin to the above composition led to perfect results.

EXAMPLE 2

An organic coating of the following composition 30. wt. % cellulose nitrate 2 wt. % polymer softener 68 wt. % solvent gave poor results when printed on using a laser printing system. By adding a powdered PU resin which is not soluble in the solvent used here, the printing results were greatly improved.

What is claimed is:

1. Coating composition comprising: at least one organic binder; and at least one of organic or inorganic, fine grained substances in an amount from 0.1–20 weight percent, wherein said inorganic fine grained substances are selected from the group consisting of silica, talcum, untreated mica, surface-treated mica, and mixtures thereof, and wherein the surface of the fine grained inorganic substances are covered with organic resins or polymers; wherein said coating composition is to be used as a bonding layer for a substrate to be laser printed.

2. Coating composition according to claim 1, wherein the organic fine grained substances are organic particles which are polymers selected from the group consisting of polyamides and polyurethanes.

3. Coating composition according to claim 1, wherein the organic substances on the surface of the inorganic particles are from the same substances making up the organic binder.

4. Coating composition according to claim 1, wherein the particles do not dissolve in the organic layer.

5. Coating composition according to claim 1, including from 0.3–10 weight percent of fine grained particles.

6. Coating composition according to claim 1, wherein the organic binder is at least one of melamine, polyesters that are cross-linkable with urea resins, polystyrene-acrylates, and cellulose nitrates.

7. Coating composition according to claim 1, wherein the organic binder is at least one of isocyanate and isocyanurate cured organic coatings based on polyester and polyacrylate.

8. Coating composition according to claim 1, wherein the organic binder includes non-curable fractions.

9. Coating composition according to claim 1, wherein the organic layer has a thickness of 1–2 microns.

10. Coating composition according to claim 1, wherein said coating composition is prepared with a solvent.

* * * * *

UNITED STATES PATENT AND TRADEMARK OFFICE
CERTIFICATE OF CORRECTION

PATENT NO. : 6,201,041 B1
DATED : March 13, 2001
INVENTOR(S) : Erwin Pasbrig et al.

It is certified that error appears in the above-identified patent and that said Letters Patent is hereby corrected as shown below:

Column 1,
Line 38, after "flexo" the comma should read a dash.
Line 38, after "photo-gravure printing" the dash should read a comma.

Column 4, claim 3,
Line 2, "particles" should read -- fine grained substances --.

Column 4, claim 4,
Line 5, "particles" should read -- fine grained substances --.

Column 4, claim 5,
Line 6, "claim 1" should read -- claim 4 --.

Column 4, claim 5,
Line 7, "particles" should read -- fine grained substances --.

Column 4, claim 8,
Line 15, "claim 1" should read -- claim 7 --.

Signed and Sealed this

Sixteenth Day of October, 2001

*Attest:*

Nicholas P. Godici

NICHOLAS P. GODICI

*Attesting Officer*

*Acting Director of the United States Patent and Trademark Office*